(12) United States Patent
Okumura et al.

(10) Patent No.: US 8,059,505 B2
(45) Date of Patent: Nov. 15, 2011

(54) DATA WRITING CONTROL DEVICE, DATA WRITING CONTROL METHOD, AND DATA WRITING CONTROL PROGRAM FOR WRITING TO AN OPTICAL DISC

(75) Inventors: Manabu Okumura, Nagano (JP); Junichi Otsuka, Chikuma (JP); Hiroki Nakazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 479 days.

(21) Appl. No.: 12/283,311

(22) Filed: Sep. 11, 2008

(65) Prior Publication Data
US 2009/0073832 A1    Mar. 19, 2009

(30) Foreign Application Priority Data
Sep. 14, 2007  (JP) ................. 2007-239989

(51) Int. Cl.
*G11B 15/52* (2006.01)
(52) U.S. Cl. .................. 369/47.15; 369/53.31
(58) Field of Classification Search .......... None
See application file for complete search history.

(56) References Cited

U.S. PATENT DOCUMENTS

| | | | |
|---|---|---|---|
| 5,594,923 A | 1/1997 | Inoue et al. | |
| 6,170,037 B1* | 1/2001 | Blumenau | 711/114 |
| 6,219,311 B1* | 4/2001 | Mitsuno | 369/30.23 |
| 7,330,914 B2 | 2/2008 | Inogai | |
| 2004/0264338 A1* | 12/2004 | Chou | 369/84 |
| 2005/0162990 A1* | 7/2005 | Murata | 369/30.23 |
| 2008/0068963 A1* | 3/2008 | Shikata | 369/84 |

FOREIGN PATENT DOCUMENTS

| | | |
|---|---|---|
| JP | 5-173932 | 7/1993 |
| JP | 2007-188548 | 7/2007 |
| WO | WO-2004/057481 A1 | 7/2004 |

* cited by examiner

*Primary Examiner* — Paul Huber
(74) *Attorney, Agent, or Firm* — Nutter McClennen & Fish LLP; John J. Penny, V.

(57) ABSTRACT

A data writing control device enables quickly writing data to optical discs. A reading process unit 62a, 62b reads data in predetermined read units from a storage device (hard disk drive 14) that has a head and stores the data. A storage unit (buffers 63a and 63b) has a storage area for storing the read units of data read by the reading process unit 62a, 62b. A writing process unit 64a, 64b acquires data stored in the storage area of the storage unit in write units, which are smaller than the read units, and supplies the acquired write units of data to an optical disc drive which is connected as a peripheral device.

9 Claims, 8 Drawing Sheets

DATA WRITING CONTROL DEVICE, DATA WRITING CONTROL METHOD, AND DATA WRITING CONTROL PROGRAM FOR WRITING TO AN OPTICAL DISC

BACKGROUND OF THE INVENTION

1. Field of Invention

The present invention relates to a data writing control device, a data writing control method, and a data writing control program.

2. Description of Related Art

When writing data to an optical disc such as a CD or DVD, the host computer first converts and stores the data to be recorded to the optical disc to disc image data on a hard disk drive. Then in response to requests from the optical disc drive, the host computer reads and supplies the disc image data from the hard disk to the optical disc drive. This process repeats until all of the data is written.

Disc publishers that have a plurality of optical disc drives and print prescribed information on the printing side of the optical discs (the label side) to which data is written by the plural optical disc drives are also known from the literature. See, for example, Japanese Unexamined Patent Appl. Pub. JP-A-2007-188548.

When writing the data to the optical disc, the host computer must repeat a process of reading and storing the data from the hard disk drive into a buffer, and then once the data is buffered reading and supplying the data from the buffer to the optical disc drive, but data cannot be supplied to the optical disc drive while data is being read from the hard disk drive. The host computer also cannot read data from the hard disk drive while supplying data to the optical disc drive. The actual data writing speed is therefore slower than the theoretical writing speed of the optical disc drive.

A further problem with a disc publisher is that because the process reading data from the hard disk drive and the process supplying the data to the optical disc drive must be repeatedly executed for each of the optical disc drives, the optical disc writing speed drops even more.

SUMMARY OF THE INVENTION

A data writing control device, a data writing control method, and a data writing control program according to the present invention are directed to the foregoing problem to enable quickly writing data to optical discs.

A data writing control device according to the present invention has a reading process unit that reads data in predetermined read units from a storage device that has a head and stores the data, a storage unit having a storage area for storing the read units of data read by the reading process unit, and a writing process unit that acquires data stored in the storage area of the storage unit in write units, which are smaller than the read units, and supplies the acquired write units of data to an optical disc drive.

This aspect of the invention reads data in predetermined read units from a storage device and stores the read data to a storage unit, and then gets the data stored in the storage unit by write units that are smaller than the read unit and supplies the write units of data to an optical disc drive to write the data to an optical disc. This enables writing data to optical disc quickly.

Preferably, the read unit is an integer multiple of the write unit in size.

With this aspect of the invention the data read in read units by the reading process unit can be acquired by the writing process unit by write units a predetermined number of times and written to optical disc. A remainder unit of data therefore does not occur, and the storage area can be managed easily when writing.

Further preferably, there are a (a>1) reading process units, writing process units, and optical disc drives, the storage unit has a storage areas, each of the a reading process units reads data by the predetermined read unit from the storage device and stores the read data to the corresponding storage area in the group of a storage areas in the storage unit, and each of the a writing process units acquires data by the predetermined write units from the corresponding storage area in the group of a storage areas in the storage unit, and supplies the acquired write units of data to the corresponding optical disc drive.

With this aspect of the invention the data stored to the storage device is read by the a reading process units in read unit blocks and stored to a storage area in the storage unit. The writing process units then get and supply the data in write units to the optical disc drives, and the optical disc drives write the data to optical discs. Data can thus be written efficiently to a plurality of optical discs.

Yet further preferably, the a reading process units and writing process units operate in parallel as independent threads.

With this aspect of the invention the a reading process units and writing process units operate in parallel as independent threads. As a result, the process units do not need to wait for operation of another process unit to end before continuing, and processing can thus proceed efficiently.

Another aspect of the invention is a data writing control method having steps of reading data in predetermined read units from a storage device that has a head and stores the data, storing the data in the read units read by the reading process unit, and acquiring data stored in the storage area of the storage unit in write units, which are smaller than the read units, and supplying the acquired write units of data to an optical disc drive.

This aspect of the invention reads data in predetermined read units from a storage device and stores the read data, and then gets the stored data by write units that are smaller than the read unit and supplies the write units of data to an optical disc drive to write the data to an optical disc. This enables writing data to optical disc quickly.

Another aspect of the invention is a data writing control program for causing a computer to function as a reading process unit that reads data in predetermined read units from a storage device that has a head and stores the data, a storage unit having a storage area for storing the read units of data read by the reading process unit, and a writing process unit that acquires data stored in the storage area of the storage unit in write units, which are smaller than the read units, and supplies the acquired write units of data to an optical disc drive.

This aspect of the invention reads data in predetermined read units from a storage device and stores the read data to a storage means, and then gets the stored data stored to the storage means by write units that are smaller than the read unit and supplies the write units of data to an optical disc drive to write the data to an optical disc. This enables writing data to optical disc quickly.

As described above, the data writing control device, data writing control method, and data writing control program according to the present invention enable quickly writing data to optical discs.

Other objects and attainments together with a fuller understanding of the invention will become apparent and appreci-

DESCRIPTION OF PREFERRED EMBODIMENTS

Preferred embodiments of a data writing control device, a data writing control method, and a data writing control program according to the present invention enabling quickly writing data to optical discs are described below.

A. General Configuration

Figure 1:
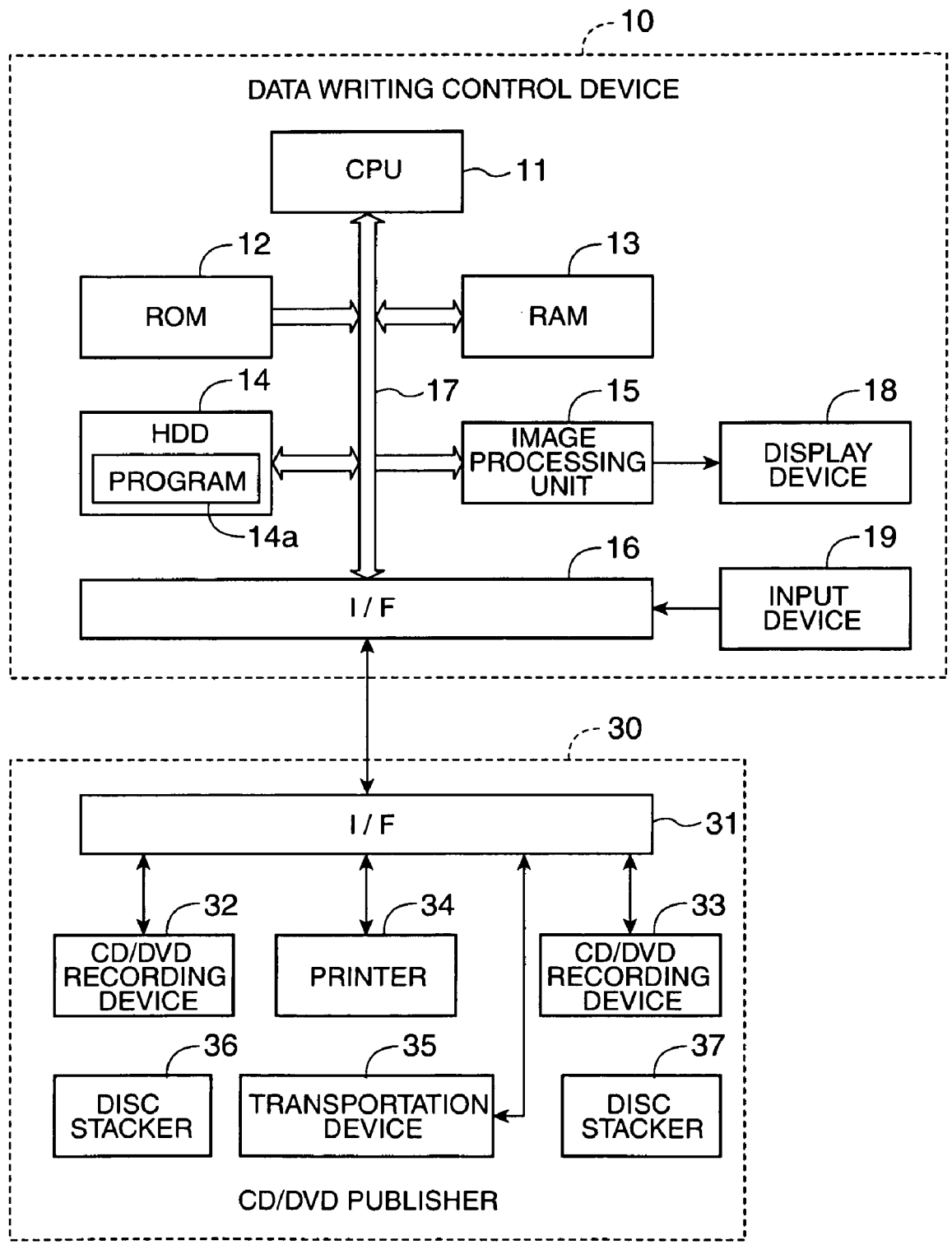
FIG. 1 is a block diagram of a data writing control device according to the present invention.

FIG. 1 is a schematic block diagram of a data writing control device-according to the present invention.

As shown in FIG. 1, the data writing control device 10 according to this embodiment of the invention has a CPU (central processing unit) 11, ROM (read-only memory) 12, RAM (random access memory) 13, a hard disk drive 14, an image processing unit 15, an interface 16, a bus 17, a display device 18, and an input device 19. A CD (Compact Disc)/DVD (digital versatile disc) publisher 30 is connected to the interface 16 of the data writing control device 10.

The CD/DVD publisher 30 has an interface 31, CD/DVD recording devices 32 and 33, a printer 34, a transportation device 35, and disc stackers 36 and 37.

The CPU 11 of the data writing control device 10 executes various operations and processes according to programs stored on the hard disk drive 14 and in ROM 12, and controls the other parts of the data writing control device 10. The ROM 12 is semiconductor memory for storing the programs executed by the CPU 11 and other data. The RAM 13 is semiconductor memory for temporarily storing the programs executed by the CPU 11 and other data. The hard disk drive 14 (storage device) is a magnetic storage device for storing the program 14a executed by the CPU 11. The process described below is run by this program 14a being executed. The hard disk drive 14 also stores the disc image data 14b as the data written to the optical disc described below.

The image processing unit 15 runs a drawing process according to a draw command from the CPU 11 to acquire and then convert an image to a video signal, and display the video signal on the display device 18.

The interface 16 is a device for exchanging data with the CD/DVD publisher 30 and converting the data to an appropriate format.

The bus 17 is a group of signal lines for interconnecting and enabling data communication between the CPU 11, ROM 12, RAM 13, hard disk drive 14, image processing unit 15, and interface 16.

The display device 18 is a CRT (cathode ray tube) or LCD (liquid crystal display), for example, and displays the video signal supplied from the image processing unit 15.

The input device 19 is, for example, a keyboard and mouse.

The interface 31 of the CD/DVD publisher 30 suitably converts the format of data exchanged through the interface 16 of the data writing control device 10.

The CD/DVD recording devices 32 and 33 (optical disc drives) are separate devices, and each writes data received through the interface 31 to an optical disc not shown.

The printer 34 is an inkjet printer in this embodiment of the invention, and prints information on the printing side (label side) of the optical discs to which data is recorded by the CD/DVD recording devices 32 and 33.

The transportation device 35 transports the optical discs, and more particularly picks and supplies the discs one at a time from the disc stackers 36 and 37 to the CD/DVD recording devices 32 and 33, then carries the optical discs after data is recorded (written) on the data recording side to the printer 34, and then either stores the printed optical discs to one of the disc stackers 36 and 37 or discharges the disc from the publisher.

Each of the disc stackers 36 and 37 can store a plurality of (such as 50) optical discs, and can be used for supplying blank optical discs that have not been recorded or printed, and for storing the optical discs after recording and printing are completed.

Figure 2:
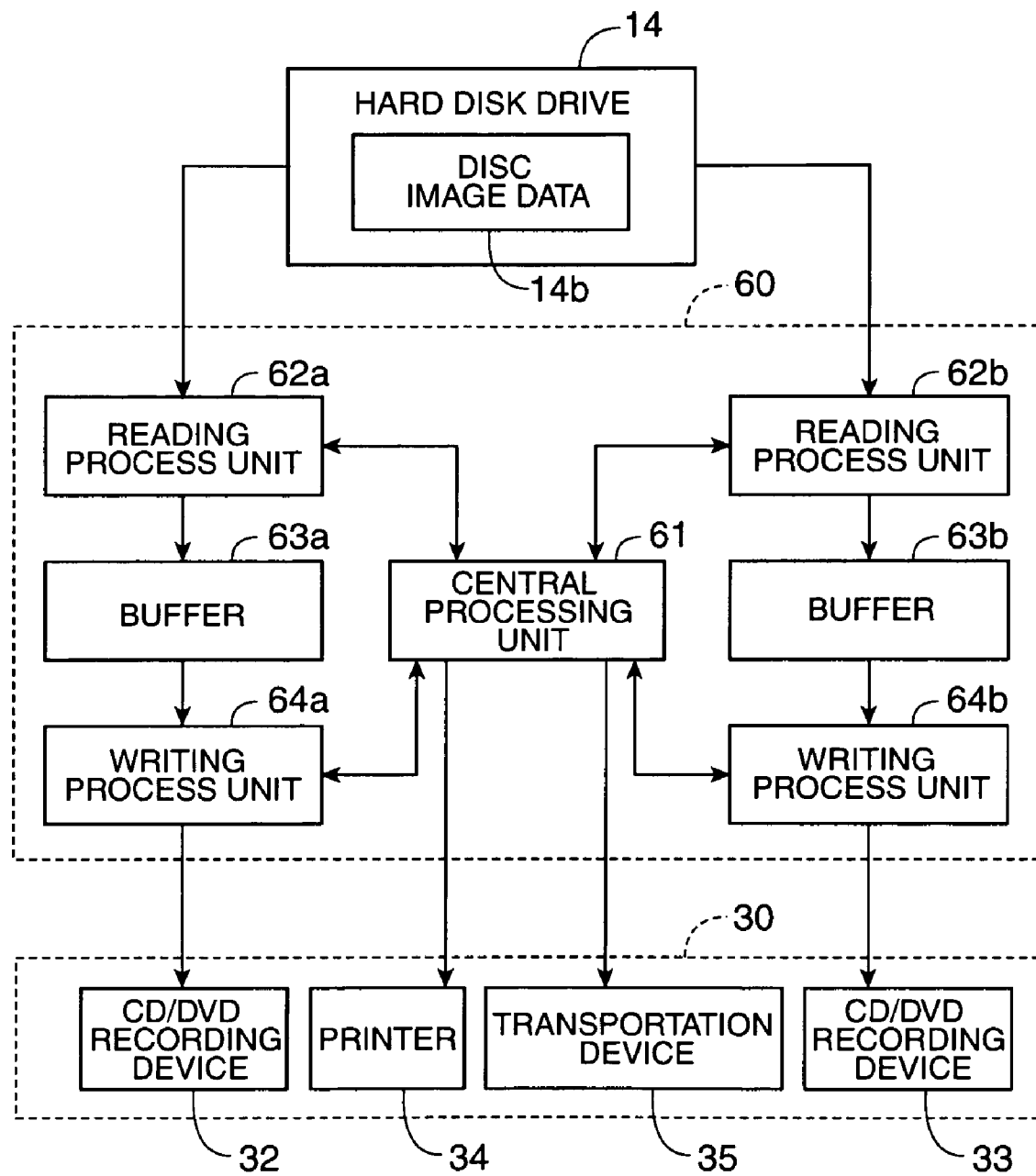
FIG. 2 is a function block diagram of a data writing control program according to the present invention.

Referring to FIG. 2, the function block groups that are rendered by the interaction of software, in the form of the program 14a, and hardware, in the form of the CPU 11 and other devices, achieved as a result of running the program 14a stored on the hard disk drive 14 shown in FIG. 1 is described next.

As shown in FIG. 2, the function block group 60 rendered by executing the program 14a includes a central processing unit 61, reading process units 62a and 62b, buffers (storage units) 63a and 63b, and writing process units 64a and 64b. the reading process unit 62a, buffer 63a, and writing process unit 64a are a function block for writing data by means of one CD/DVD recording device 32, and reading process unit 62b, buffer 63b, and writing process unit 64b are a function block for writing data by means of another CD/DVD recording device 33.

In addition, the reading process unit 62a, writing process unit 64a, reading process unit 62b, and writing process unit 64b are function blocks that operate in parallel on separate threads.

The central processing unit 61 is the core block for processing by the function block group 60, and controls the other function blocks so that processes are executed appropriately.

The reading process units 62a and 62b read and store the disc image data 14b stored on the hard disk drive 14 in read units of a predetermined size to the buffers 63a and 63b, respectively.

The buffers 63a and 63b are reserved in RAM 13, for example, and have areas for storing a plurality of read blocks of the data.

The writing process units 64a and 64b acquire the data from the corresponding buffer 63a and 63b in write units of a predetermined size, and supply the data to the corresponding CD/DVD recording devices 32 and 33.

The CD/DVD recording devices 32 and 33 then write the data to an optical disc not shown.

Figure 3:
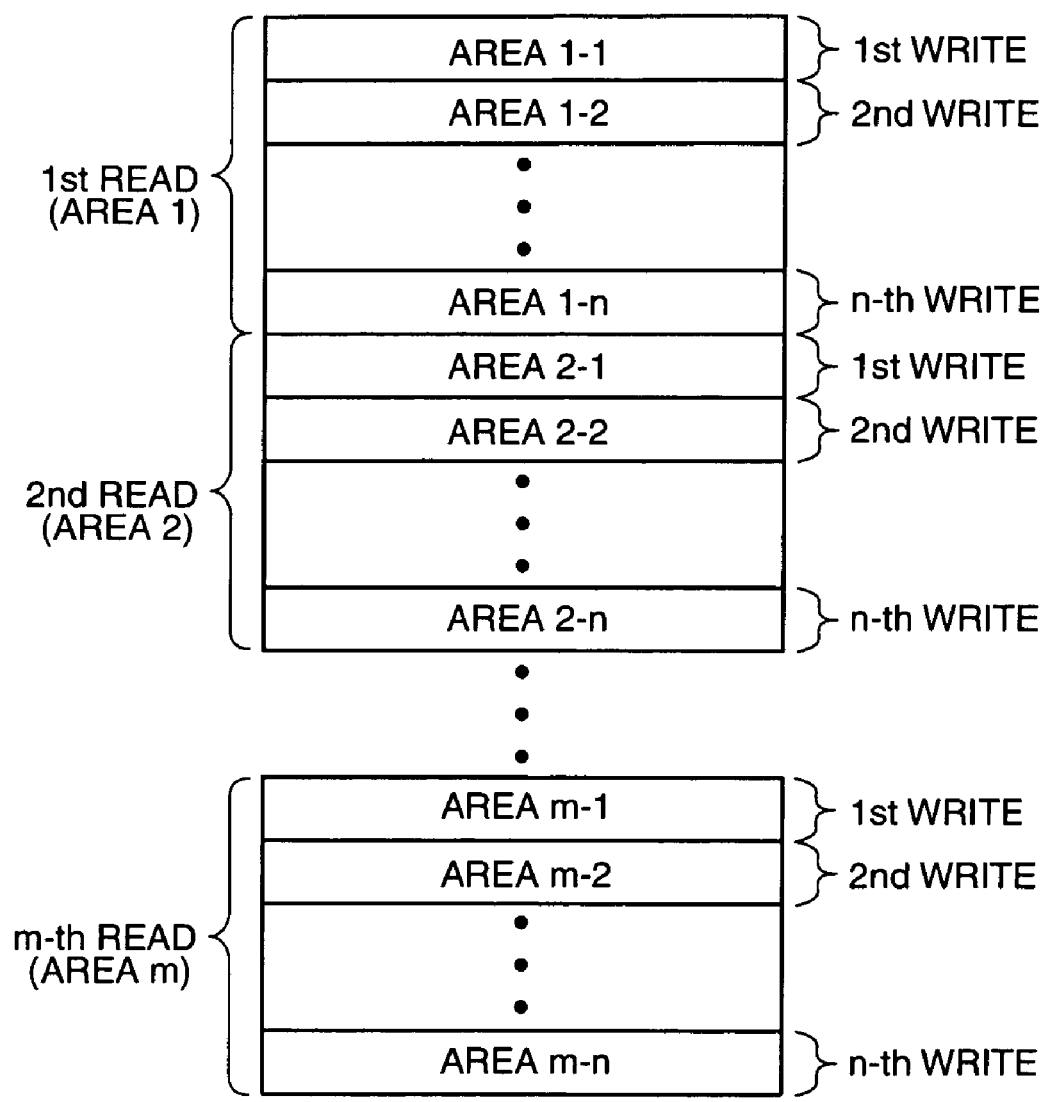
FIG. 3 shows the buffer configuration.

FIG. 3 shows the structure of the buffers 63a and 63b. In this embodiment of the invention the buffers 63a and 63b have m storage areas from area 1 to area m, and each storage area has n sub-areas. The first unit of data read from the hard disk drive 14 is stored to area 1. The second to m-th units of data are similarly stored to areas 2 to m. Data unit m+1 is then stored to area 1; and the sequence repeats.

The data stored to areas 1 to m is read in n operations and written to optical disc. When data is written n times from each area, the write process proceeds to the next area and the sequence repeats. When writing the last block in area m (that is, area m-n) ends, the write process repeats from the beginning of area 1 (that is, area 1-1).

The unit of data read in one process is referred to as the "read unit" below, and the unit of data written in one process is referred to as the "write unit." More specifically, the read unit corresponds to the amount of data that is read from the hard disk drive 14 and stored in area 1 to area m in one reading operation, and the write unit corresponds to the amount of data that is acquired from area 1-1 to area m-n and written to the optical disc in one writing operation.

In this embodiment of the invention the read unit is set to 4 MB and the write unit is set to 1 MB, for example. The invention is not so limited, however, and different numbers of bytes (different sizes) can be used instead.

How many read units can be stored to RAM 13 (that is, the value of m) can be determined according to the capacity of the RAM 13 in the data writing control device 10. Increasing the value of m improves the optical disc writing speed, but if m is too large data swapping between the RAM 13 and hard disk drive 14 can conversely slow the processing speed.

B. Basic Operation

The basic operation of this embodiment of the invention is described next. Two situations are described below, writing data to an optical disc using one CD/DVD recording device 32, and writing data to optical discs using two CD/DVD recording devices 32 and 33.

B-1 Writing Data to an Optical Disc Using One CD/DVD Recording Device 32

When data is written by one CD/DVD recording device 32, the reading process unit 62a, buffer 63a, and writing process unit 64a operate and the reading process unit 62b, buffer 63b, and writing process unit 64b shown in FIG. 2 do not operate.

When the disc image data 14b, which is the information written to the optical disc, is generated and stored to hard disk drive 14, the function block group 60 starts the writing process.

The central processing unit 61 first instructs the reading process unit 62a to execute the reading process. As a result, the reading process unit 62a stores only the read unit of the disc image data 14b from the hard disk drive 14 to the buffer 63a. This results in a read unit of data being stored from the beginning of the disc image data 14b to area 1 in FIG. 3.

When the reading process ends, the central processing unit 61 instructs the writing process unit 64a to execute the writing process. As a result, the writing process unit 64a gets and supplies a write unit of data from the buffer 63a to the CD/DVD recording device 32. In this example data is acquired from area 1-1 at the beginning of area 1 in FIG. 3 and supplied to the CD/DVD recording device 32. The CD/DVD recording device 32 then writes the data to an optical disc not shown.

The reading process of the reading process unit 62a and the writing process of the writing process unit 64a operate in parallel as separate threads. As a result, the reading process unit 62a executes the reading process parallel to the writing process of the writing process unit 64a, repeats the reading process until reading area m ends, returns to area 1 when processing area m ends, and stores the new read data to the area for which writing is completed. The writing process unit 64a likewise executes the writing process parallel to the reading process of the reading process unit 62a, acquires data in write unit blocks from the areas for which reading is completed, and supplies the data to the CD/DVD recording device 32. When writing area m-n is completed, the writing process returns to area 1-1 and repeats.

Figure 4:
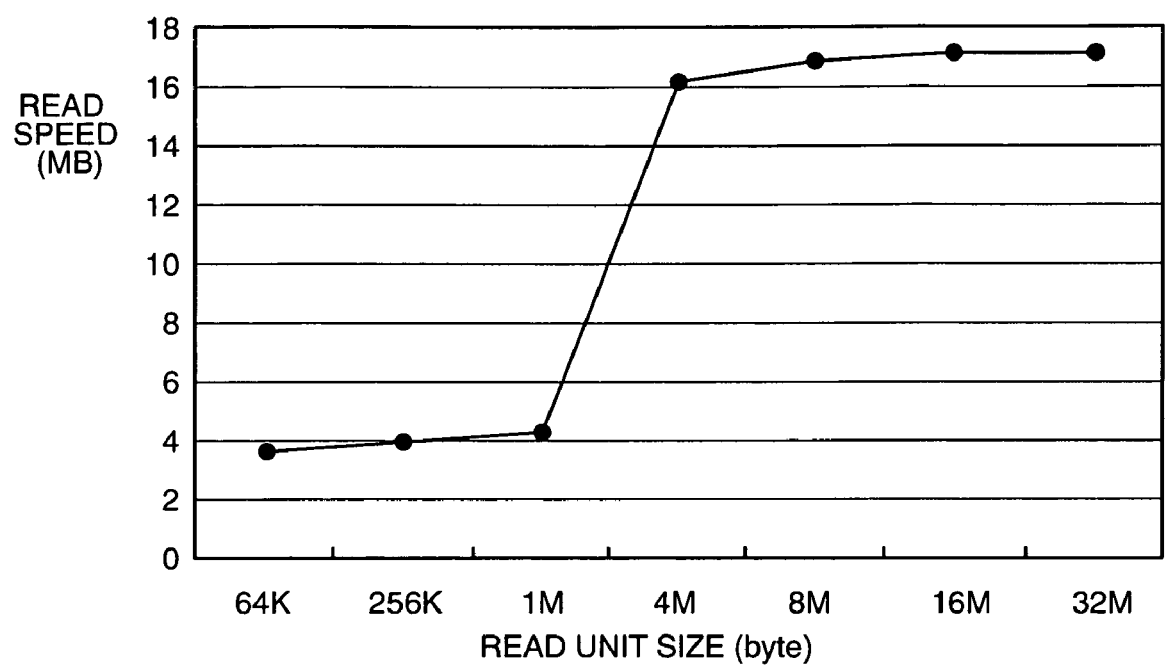
FIG. 4 is a graph of the relationship between reading volume and reading speed.

This embodiment of the invention thus stores data in read units, which are larger than the write units, from the hard disk drive 14 to the buffers 63a and 63b. As shown in FIG. 4, speed increases when the relationship between the hard disk drive 14 read speed and the read size crosses a certain size threshold. This is because if data is read in small blocks, the read speed is limited by the seek speed of the head. In the example shown in FIG. 4 the read speed increases when the amount of data read in one read operation is 4 MB. Therefore, by setting the read unit shown in FIG. 3 to approximately 4 MB (or more), data can be read at high speed and stored to the buffer 63a.

As also described above, the reading process unit 62a and writing process unit 64a operate in parallel as separate threads reading and writing from different areas. This makes it possible to, for example, read from area 2 while writing from area 1 at the same time in parallel, thus eliminating the waiting time imposed when accessing the same area, and further increasing processing speed.

B-2 Writing Using Two CD/DVD Recording Devices

When data is written using two CD/DVD recording devices 32 and 33, the reading process units 62a and 62b, buffers 63a and 63b, and writing process units 64a and 64b all operate. The reading process unit 62a, buffer 63a, and writing process unit 64a and the reading process unit 62b, buffer 63b, and writing process unit 64b separately execute the same process executed when data is written by one CD/DVD recording device as described above.

More specifically, the reading process units 62a and 62b separately read and store a read unit of the disc image data 14b from the hard disk drive 14 to the corresponding buffers 63a and 63b. The writing process units 64a and 64b then acquire and supply a write unit of data from the buffers 63a and 63b to the corresponding CD/DVD recording devices 32 and 33. The CD/DVD recording devices 32 and 33 then write the data to optical discs not shown. The reading process units 62a and 62b and writing process units 64a and 64b can thus operate in parallel on separate threads.

Figure 5:
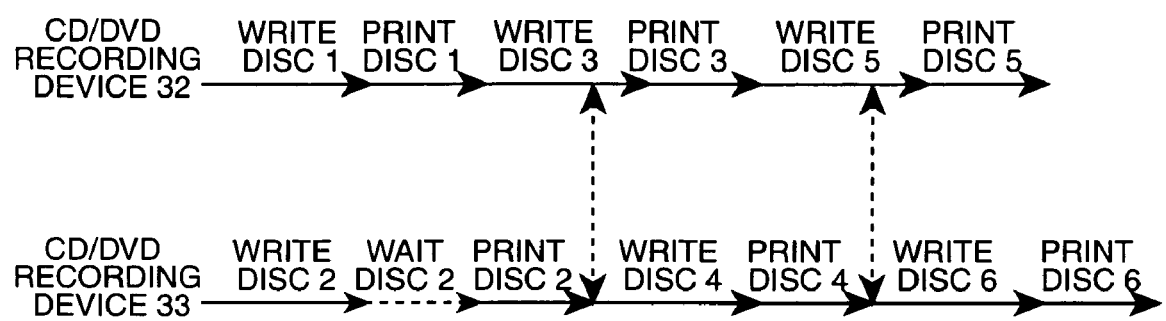
FIG. 5 shows the writing and printing sequence.

However, while the two CD/DVD recording devices 32 and 33 execute parallel writing processes, the embodiment shown in FIG. 1 has only one printer 34. As a result, when the optical disc written by one recording device is being printed, the optical disc written by the other recording device must wait for printing. As a result, as shown in FIG. 5, when data is written to six optical discs and information is then printed, the first and second discs are written substantially in parallel, but the optical disc that has been written by the second CD/DVD recording device 33 waits for printing the first disc by the printer 34 to end. As a result, the optical disc write timing of the third and later discs differs.

More specifically, when writing the fourth disc starts, writing the third disc is half completed. The disc image data 14b stored in the hard disk drive 14 is a maximum of approximately 700 MB in the case of CD media, and approximately 4.7 GB in the case of DVD media, and is therefore stored over a large area in the hard disk drive 14. As a result, the data for the fourth optical disc is read from the beginning of the disc image data 14b while the data for the third optical disc is read from near the end of the disc image data 14b.

Figure 6A:
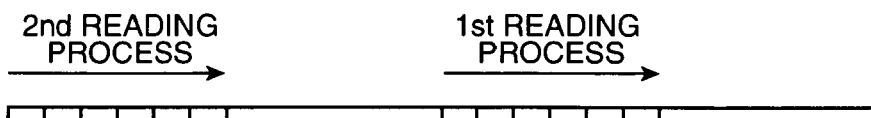
FIG. 6 describes the movement of the head when reading data from the hard disk drive.
Figure 6B:
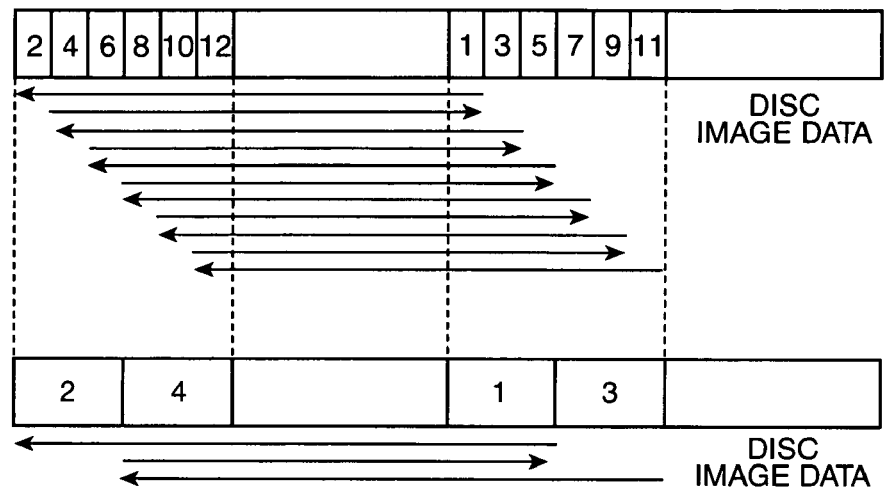

Because these areas are separated on the hard disk drive 14, the hard disk drive 14 head must travel back and forth between these separate areas. When the read unit is small as shown in FIG. 6(A), the hard disk drive 14 head must therefore travel back and forth many times as indicated by the arrows. When the read unit is large as shown in FIG. 6(B), the hard disk drive 14 head travels back and forth fewer times. Because movement of the hard disk drive 14 head has an average seek time of several milliseconds to several ten milliseconds, frequent movement in this way dramatically reduces the read speed.

By using a large read unit (such as approximately 4 MB), this embodiment of the invention dramatically reduces the number of seek operations as shown schematically in FIG. 6(B). When the read position of the disc image data 14*b* differs greatly such as when writing the third and fourth discs in FIG. 5, reducing the number of seek operations can shorten the time required for reading.

C. Detailed Description of Operation

Figure 7:
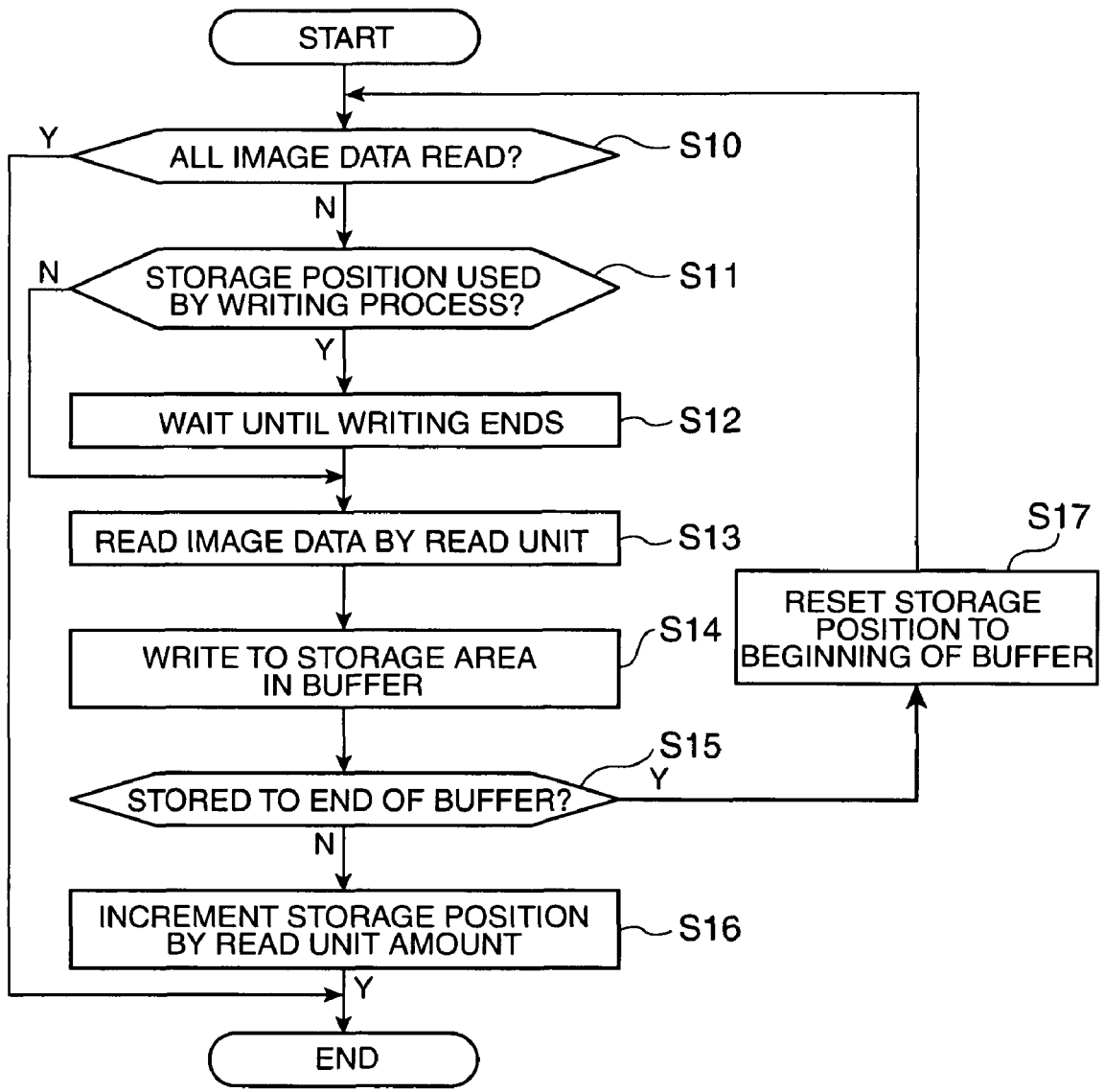
FIG. 7 is a flow chart of the reading process according to a preferred embodiment of the invention.
Figure 8:
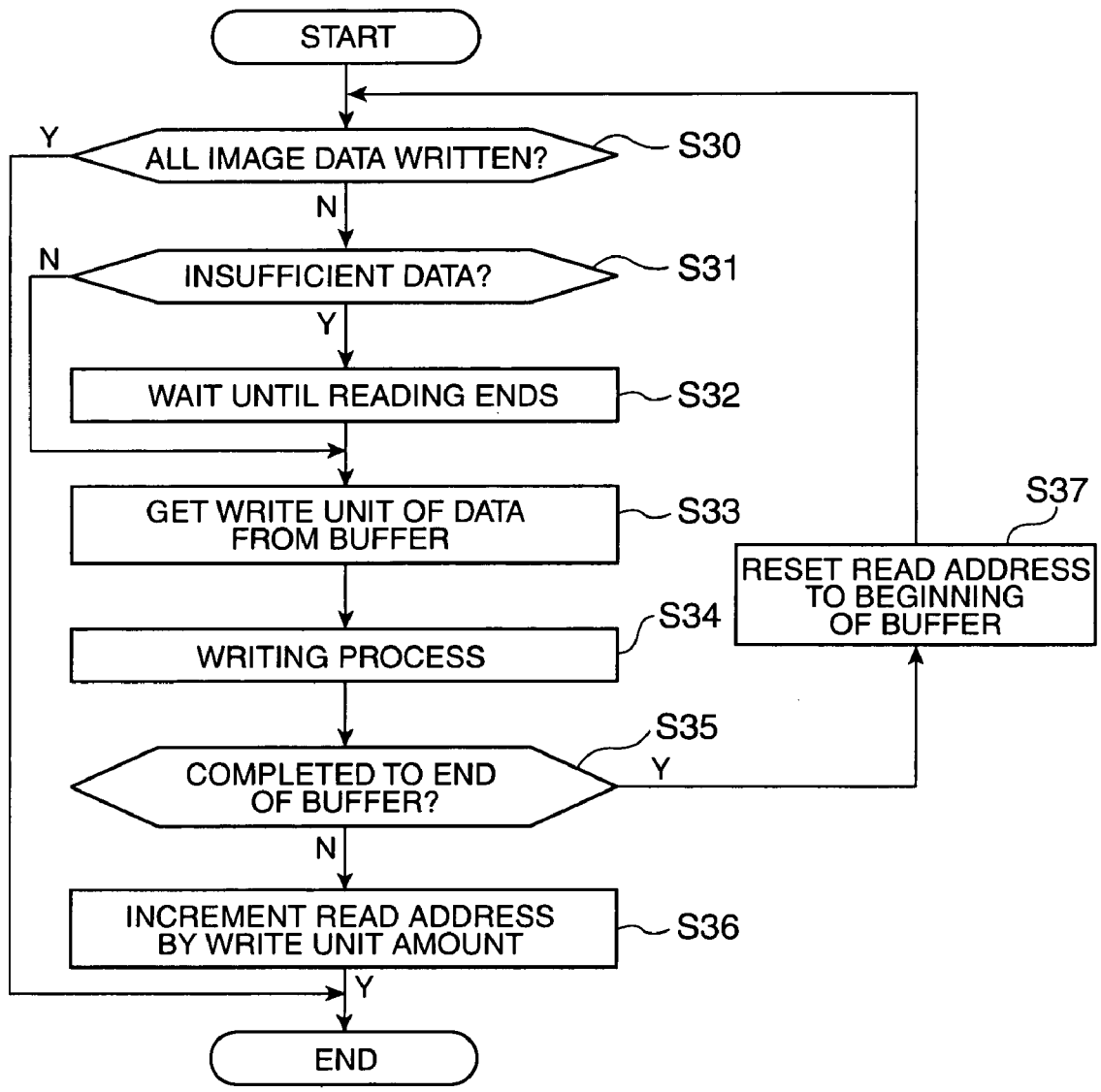
FIG. 8 is a flow chart of the writing process according to a preferred embodiment of the invention.

The operation of this embodiment of the invention is described next with reference to FIG. 7 and FIG. 8. FIG. 7 is a flow chart describing in detail the operation of the reading process units 62*a* and 62*b*, and FIG. 8 is a flow chart describing in detail the operation of the writing process units 64*a* and 64*b*. Because the reading process units 62*a* and 62*b* operate in the same way and the writing process units 64*a* and 64*b* operate in the same way, the reading process unit 62*a* and writing process unit 64*a* are used below by way of example.

Operation of the reading process unit 62*a* is described first with reference to FIG. 7.

The central processing unit 61 first determines if all of the disc image data 14*b* has been read into the buffer 63*a* (step S10). If all of the disc image data 14*b* has been read (step S10 returns Yes), operation ends. Otherwise (step S10 returns No), control goes to step S11.

In step S11 the central processing unit 61 determines if the storage area, which is the area in the buffer 63*a* to which the data read from the hard disk drive 14 is to be written, is currently being used in the writing process by the writing process unit 64*a* (step S11). If it is being used in the writing process (step S11 returns Yes), control goes to step S12, but otherwise (step S11 returns No) control goes to step S13. In step S12 the reading process unit 62*a* waits until writing to the storage position ends.

More specifically, if, for example, the writing process unit 64*a* is writing the data in area 1-1 to CD/DVD recording device 32 and the storage position is area 1, the data currently being written will be overwritten by the new data read from the hard disk drive 14, and operation therefore waits until the writing process for area 1-n ends.

In step S13 the central processing unit 61 instructs the reading process unit 62*a* to read a read unit of the disc image data 14*b* from the hard disk drive 14. As a result, the reading process unit 62*a* reads (step S13) and writes (step S14) a read unit of the disc image data 14*b* from the hard disk drive 14 to the storage position in the buffer 63*a*. More specifically, in the first loop through the process after operation starts in FIG. 7, a read unit of data is read from the beginning of the disc image data 14*b* and is stored to area 1 in the buffer 63*a*. Data transfer from the hard disk drive 14 to the RAM 13 (buffer 63*a*) is preferably done by DMA (direct memory access) transfer in this embodiment of the invention so that data can be transferred at high speed.

In step S15 the central processing unit 61 determines if data has been stored to the end of the buffer 63*a*. If it has (step S15 returns Yes), control goes to step S17, but otherwise ((step S15 returns No) control goes to step S16. For example, if the current storage position is area m, data has been stored to the last storage position and control goes to step S17.

In step S17 the central processing unit 61 moves the storage position to the beginning of the buffer 63*a*. More specifically, if the current storage position is area m, the storage position returns to area 1. Control then loops back to step S10, and the same process repeats.

In step S16 the storage position is incremented by the read unit. More specifically, if the current storage position is area 1, the storage position moves to area 2. Control then loops to step S10, and the same process repeats.

This process enables sequentially reading and writing the disc image data 14*b* stored in the hard disk drive 14 in read units to the buffer 63*a*.

Note that the reading process unit 62*b* operates in the same way to sequentially read and write the disc image data 14*b* from the hard disk drive 14 to the buffer 63*b* in read units.

The operation of the writing process unit 64*a* is described next with reference to FIG. 8.

The central processing unit 61 first determines if all of the disc image data 14*b* has been written to the optical disc (step S30). If all of the data has been written (step S30 returns Yes), processing ends. Otherwise (step S30 returns No), control goes to step S31.

In step S31 the central processing unit 61 determines if sufficient data has been stored in the buffer 63*a*. If sufficient data has not been stored (step S31 returns Yes), control goes to step S32. Otherwise (step S31 returns No), control goes to step S33. For example, if writing area 1-n has been completed but reading area 2 has not been completed, step S31 returns Yes and control goes to step S32.

In step S32 the writing process unit 64*a* waits until the reading process of the reading process unit 62*a* ends. In the above example the writing process unit 64*a* waits until reading area 2 ends.

In step S33 the central processing unit 61 instructs the writing process unit 64*a* to get data from the buffer 63*a* in write units and write the data to the CD/DVD recording device 32. As a result, the writing process unit 64*a* gets a write unit of data from the read position in the buffer 63*a* (the position from data is to be acquired) (step S33), supplies the data to the CD/DVD recording device 32, and causes the data to be written to the optical disc not shown (step S34).

More specifically, in the first loop through this process after the process shown in FIG. 8 starts, the read position is area 1-1, data is therefore acquired from area 1-1 in buffer 63*a* and supplied to the CD/DVD recording device 32. The CD/DVD recording device 32 then writes the supplied data to the optical disc not shown. Data transfer from the RAM 13 (buffer 63*a*) to the CD/DVD recording device 32 is preferably done by DMA transfer in this embodiment of the invention so that data can be transferred at high speed.

In step S35 the central processing unit 61 determines if data was acquired to the end of the buffer 63*a*. If the buffer 63*a* has been read to the end (step S35 returns Yes), control goes to step S37, but otherwise (step S35 returns No) control goes to step S36. For example, if the current read position is area m-n, the central processing unit 61 determines the buffer has been read to the end and control goes to step S37.

In step S37 the read position moves to the beginning of the buffer 63*a*. More specifically, if the current read position is area m-n, the read position is reset to area 1-1. Control then returns to step S30 and the same process repeats.

In step S36 the read position is incremented by the write unit. More specifically, if the current read position is area 1-1, the read position moves to area 1-2. Control then returns to step S30 and the process repeats.

This process acquires and supplies the data stored in the buffer 63a in write units to the CD/DVD recording device 32 for writing to optical disc. The writing process unit 64b executes the same process to acquire and supply the data stored in the buffer 63b in write units to the CD/DVD recording device 33 for writing to optical disc.

Furthermore, because the reading process units 62a and 62b and writing process units 64a and 64b operate on separate threads, they alternatively use the CPU 11 and seem to operate in parallel. As a result, one process does not need to wait for another process to end, and the reading and writing processes can execute quickly.

In addition, because the reading process units 62a and 62b execute the reading process before the writing process units 64a and 64b operate, sufficient data is read and stored in the buffers 63a and 63b, and the writing process can proceed stably.

As described above, the read unit is larger than the write unit in this embodiment of the invention. By thus shortening the time required for seeking by the head of the hard disk drive 14, the speed at which data can be recorded to optical disc can be improved.

In addition, because the reading process and writing process execute as independent threads, and the reading process is executed before the writing process, one process does not need to wait for the other process to end, and the overall program execution speed can be improved.

More particularly, data is recorded to optical discs such as CD and DVD media from the inside circumference to the outside circumference of the disc. Because the rotational speed of the disc is substantially constant irrespective of the writing position (disc address), the linear velocity is slower at the inside circumference than the outside circumference, and the data writing speed is therefore slower at the inside circumference. Therefore, by first executing the reading process when starting to write an optical disc, a large amount of data can be stored in the buffers 63a and 63b. As the write position moves to the outside, the data previously accumulated in the buffers 63a and 63b can be used for the writing process, and the writing process can proceed efficiently.

Furthermore, by using reading process units 62a and 62b, buffers 63a and 63b, and writing process units 64a and 64b dedicated to each recording device to read the disc image data 14b from the hard disk drive 14 and write to optical disc, and executing the processes of the reading process units 62a and 62b and writing process units 64a and 64b as independent threads when two CD/DVD recording devices 32 and 33 are used for writing optical discs, the waiting time of the processes is reduced and the overall process execution speed can be improved.

Particularly when discs are written using two CD/DVD recording devices 32 and 33 and labels are printed on the discs using one printer 34 as in the embodiment of the invention described above, the disc image data 14b written by each of the CD/DVD recording devices 32 and 33 is stored at different places on the hard disk drive 14. However, by setting the read unit to a suitably large size, the number of times the head of the hard disk drive 14 must move can be reduced, seeking time can therefore be reduced, the time spent reading data is thus reduced, and as a result the writing time can be shortened.

D. Other Embodiments of the Invention

A preferred embodiment of the invention is described above but it will be obvious that the invention can be modified and adapted in many ways without departing from the scope of the accompanying claims.

For example, the CD/DVD publisher 30 records an edited data file to optical disc in the embodiment described above, but could record to other types of storage media instead, including floppy disks and magneto-optical discs.

The embodiment of the invention described above has two CD/DVD recording devices 32 and 33 and one printer 34, but there could obviously be three or more CD/DVD recording devices or two or more printers. Note that if there are three or more CD/DVD recording devices, the reading process units, buffers, and writing process units shown in FIG. 2 are provided according to the number of CD/DVD recording devices.

The embodiment of the invention has one hard disk drive 14, but there could be two or more hard disk drives. If there are two hard disk drives, for example, disc image data can be stored to each hard disk drive and the reading process unit 62a and reading process unit 62b could read data from different hard disk drives. With this configuration the head of the hard disk drive does not need to move for each reading process unit, the head therefore does not need to travel back and forth as shown in FIG. 6, and the reading process can execute quickly.

If plural hard disk drives are used, they are preferably not set as master and slave drives and are instead preferably set as primary and secondary drives. More specifically, because master and slave drives are connected by the same cable, data access is concentrated on the same path and data transfers must wait. Primary and second drives, however, are connected to the bus 17 using different connector cables, and data can therefore be read more quickly.

The read unit is an integer multiple of the write unit in the embodiment described above, but the read unit is not limited to an integer multiple. Because the amount of data stored to the write area located at the end of the read area (area 1-n, area 2-n, for example) will be different from the amount of data in the other write areas in this configuration, the write unit in this area can be changed.

The write unit and read unit are fixed sizes in the embodiment described above, but can be adjusted according to the system, for example. More specifically, the optimum write unit and read unit sizes can be determined by executing a write simulation varying the read unit and write unit sizes at a predetermined time (such as before writing or when the program 14a starts). Because the write speed is different for CD and DVD media, and the write speed can vary according to the characteristics of a specific disc even when using media of the same type, and the write unit and read unit sizes can be set according to the type and properties of the media to be written.

The write unit and read unit can also be changed dynamically according to the position being written on the optical disc. For example, because the write speed is slower at the inside circumference of an optical disc, the ratio of the read unit to the write unit is set relatively high in order to accumulate data in the buffers 63a and 63b. Because the write speed increases to the outside of the optical disc, however, the ratio of the read unit to the write unit is conversely set relatively low.

Furthermore, because the printer 34 and CD/DVD recording devices 32 and 33 are connected to the data writing control device 10 through the same connection cable, the data transfer speed to the CD/DVD recording devices 32 and 33 can be expected to drop when data is being sent from the data writing control device 10 to the printer 34. The write unit and read unit can therefore be set according to printer 34 usage.

For example, when data is written to the optical discs without using the printer 34, the write unit can be set larger than when the printer 34 is used.

The write unit can also be set according to the amount of data transferred to the printer 34. More specifically, because the amount of data transferred is less when a low resolution image is sent to the printer 34, the write unit can be set larger than when a high resolution image is sent.

The functions of the invention described above can be achieved by a computer. In this configuration the process content of the functions of the data writing control device are provided by the program described above. The computer executes the program to achieve the functions of the foregoing processes. The program recording these processes can be recorded on a computer-readable storage medium. Examples of such computer-readable storage media include magnetic recording media, optical discs, magneto-optical discs, and semiconductor memory. Examples of magnetic recording media include hard disk drives, floppy disks, and magnetic tape. Examples of optical discs include DVD (Digital Versatile Disc), DVD-RAM, CD-ROM (Compact Disc ROM), CD-R (CD-Recordable), and CD-RW (CD-ReWritable). An example of magneto-optical discs is the MO (Magneto-Optical disc).

The program can be distributed recorded to portable media such as a DVD or CD-ROM storing the program. The program can also be stored in the storage device of a server computer, and transmitted over a network from the server computer to another computer.

The computer that executes the program can store the program recorded to portable media or transmitted from a server computer to its own local storage device. The computer then reads the program from its own storage device and executes processes according to the program. The computer can alternatively read the program directly from the portable media and executes processes according to the program. Further alternatively the computer can sequentially execute the processes according to the program as the program is transmitted from the server computer.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A data writing control device comprising:
   at least one reading process unit that reads data in predetermined read units from a storage device that has a head;
   at least one storage unit having a storage area for storing the data in the predetermined read units; and
   at least one writing process unit that acquires data stored in the storage area of the at least one storage unit in write units, which are smaller than the predetermined read units, and supplies the write units to an optical disc drive.

2. The data writing control device described in claim 1, wherein:
   each of the predetermined read units is an integer multiple of one of the write units in size.

3. The data writing control device described in claim 1, wherein:
   the at least one reading process unit and the at least one writing process unit operate in parallel as independent threads.

4. The data writing control device described in claim 2, wherein the data writing control device comprises:
   plurality of reading process units, a plurality of writing process units, and a plurality of optical disc drives;
   the at least one storage unit has a plurality of storage areas;
   each of the plurality of reading process units reads data by the predetermined read units from the storage device and stores the predetermined read data to a corresponding storage area in the plurality of storage areas; and
   each of the plurality of writing process units acquires data by the predetermined write units from a corresponding storage area in the plurality of a storage areas, and supplies the write units to a corresponding optical disc drive.

5. The data writing control device described in claim 4, wherein:
   the plurality of reading process units and the plurality of writing process units operate in parallel as independent threads.

6. A data writing control method comprising steps of:
   reading data in predetermined read units from a storage device that has a head;
   storing the data in the predetermined read units; and
   acquiring data stored in a corresponding storage area of a storage unit in write units, which are smaller than the read units, and supplying the write units to an optical disc drive.

7. The data writing control method described in claim 6, wherein:
   each of the predetermined read units is an integer multiple of one of the write units in size.

8. The data writing control method described in claim 6, wherein:
   the reading step and the steps from acquiring to supplying data to the optical disc drive operate in parallel as independent threads.

9. A data writing control program stored on a computer readable storage medium, for causing a computer, including a processor, to function as:
   a reading process unit, implemented on the processor, that reads data in predetermined read units from a storage device that has a head;
   a storage unit having a storage area for storing the data in the predetermined read units; and
   a writing process unit, implemented on the processor that acquires data stored in the storage area in write units, which are smaller than the read units, and supplies the write units of data to an optical disc drive.

* * * * *